Patented May 25, 1937

2,081,755

UNITED STATES PATENT OFFICE 2,081,755

ANTHRAQUINONE DYESTUFFS

Frank Lodge, Blackley, Manchester, England, assignor to Imperial Chemical Industries Limited, a corporation of Great Britain No Drawing. Application March 14, 1935, Serial No. 11,161. In Great Britain March 19, 1934

12 Claims. (Cl. 260—59)

This invention relates to the manufacture of new coloring matters suitable for use in coloring oils, spirits, waxes, rubber, and the like, and as intermediates for the preparation of acid dyestuffs of the anthraquinone series.

These new coloring matters are anthraquinonyl alkyl sulfides carrying auxochromic groups, e. g., amino, alkylamino, hydroxyalkylamino, arylamino, hydroxy, aryloxy, benzylmercapto, etc., and also carrying, if desired, chloro or bromo substituents to facilitate the subsequent introduction of sulfonic acid groups. They may be made either by (1) causing a mercapto-anthraquinone carrying auxochromic groups as mentioned above, and if desired, also halogens, to react with a long chain alkyl ($C_8$—$C_{20}$) chloride or bromide, or (2) causing a chloro- or bromo-anthraquinone carrying one or more chlorine or bromine atoms and also auxochromic groups as mentioned above to react with a long chain alkyl ($C_8$—$C_{20}$) mercaptan, whereby the same or similar thio ethers are produced.

These new coloring matters are useful as such for coloring oils, spirits, waxes, rubber, etc., or as dyestuff intermediates, especially as intermediates for new acid dyestuffs.

The invention is illustrated but not limited by the following examples, in which the parts used are by weight.

Example 1

For this example 1,4-diamino-2-mercaptoanthraquinone is made thus:

100 parts of 2-bromo-1,4-diaminoanthraquinone, 1000 parts of alcohol and 100 parts of a 30% aqueous solution of sodium hydrosulfide are stirred together at the boil for 2 hours. The resulting violet solution then contains 1,4-diamino-2-mercaptoanthraquinone.

To the so-obtained solution are added 120 parts of cetyl bromide and the mixture is boiled with stirring under a reflux condenser for 2 hours. After cooling the suspension to 30° C., the product is filtered off and washed with alcohol. It is purified if necessary by recrystallization from acetic acid. The so-obtained new compound (1,4-diamino-2-anthraquinonyl cetyl sulfide) is a violet wax-like substance which dissolves readily in cold benzene.

Example 2

50 parts of sodium 2-chloro-1,4-diaminoanthraquinonyl-(3)-mercaptide, prepared according to Example 1 of British Patent No. 387,765, 500 parts of alcohol and 35 parts of dodecyl bromide are boiled with stirring under a reflux condenser for 1½ hours. The mixture is cooled, filtered and the violet crystalline product washed successively with alcohol and water and dried below 50° C.

The new compound, 2-chloro-1,4-diamino-3-anthraquinonyl-dodecyl sulfide, dissolves to a brownish solution in concentrated sulfuric acid. It dissolves readily in benzene, acetone, turpentine and kerosene to give bright violet solutions.

Example 3

For this example, 1-amino-5-mercaptoanthraquinone is made as follows:

100 parts of 1-chloro-5-aminoanthraquinone, 1500 parts of alcohol and 400 parts of a 25% aqueous solution of sodium disulfide are stirred at the boil for 16 hours. The 1-amino-5-mercaptoanthraquinone obtained is filtered off when the mixture is cold and washed with alcohol.

The 1-amino-5-mercaptoanthraquinone is stirred into 1000 parts of alcohol, 80 parts of dodecyl bromide are added and the mixture is heated at 80° C. for 1 hour. The orange product which separates is filtered off when cold and washed with alcohol.

The so-obtained new compound, 1-amino-5-anthraquinonyl dodecyl sulfide, dissolves readily in benzene.

Example 4

100 parts of 1-bromo-4-methylaminoanthraquinone, 85 parts of cetyl mercaptan, 500 parts of pyridine and 50 parts of 32% aqueous caustic soda are stirred at the boil for 2 hours. The reaction mixture is cooled, poured into water and the product filtered off, washed with water and dried.

The so-obtained new compound, 1-methylamino-4-anthraquinonyl cetyl sulfide, is a violet substance which dissolves readily in cold benzene.

Example 5

1-amino-4-anilino-2-mercaptoanthraquinone is made for this example by mixing 100 parts of 2-bromo-1-amino-4-anilinoanthraquinone, 1000 parts of alcohol and 100 parts of 30% sodium hydrosulfide solution and stirring at the boil for 5 hours.

To the violet solution so obtained, 100 parts of dodecyl bromide are added and the mixture is boiled gently for 1 hour. After cooling the product is filtered, washed with alcohol and dried at 30–40° C. It may be recrystallized from acetic acid.

The so-obtained new product, 1-amino-4-anilino-2-anthraquinonyl dodecyl sulfide, is a dark blue crystalline substance which dissolves readily in benzene to a blue solution, and in concentrated sulfuric acid to a red-violet solution.

*Example 6*

1-amino-4-anilino-2-anthraquinonyl cetyl sulfide is made as in Example 5, but using cetyl bromide instead of dodecyl bromide.

*Example 7*

100 parts of 1,4-diamino-2-phenoxy-3-mercaptoanthraquinone prepared according to Example 2 of British Patent No. 387,765, 375 parts of pyridine and 55 parts of dodecyl bromide are stirred together at 90–95° C. for 1 hour. After cooling, the violet mixture is diluted with 1000 parts of water and 500 parts of hydrochloric acid and filtered. The product is washed successively with alcohol and water. It is dried below 50° C.

The new compound, 1,4-diamino-2-phenoxy-3-anthraquinonyl dodecyl sulfide, crystallizes from acetone in violet plates. It dissolves in concentrated sulfuric acid with a weak brown color and is readily soluble in benzene, turpentine and kerosene yielding violet solutions.

*Example 8*

The process of Example 7 is done with cetyl bromide instead of dodecyl bromide; 65 parts of cetyl bromide are used.

The so-obtained new product, 1,4-diamino-2-phenoxy-3-anthaquinonyl cetyl sulfide, has properties similar to those of Example 7.

*Example 9*

For this example 100 parts of 2-chloro-1,4-diamino-3-benzylmercaptoanthraquinone are converted to 1,4-diamino-3-benzylmercapto-2-mercaptoanthraquinone by the process of French Patent No. 668,891, and isolated in paste form as the free mercaptan.

This paste is stirred with 500 parts of pyridine and 70 parts of dodecyl bromide at 90–95° C. for 1 hour. The mixture changes color from violet to blue. After cooling and diluting with 1000 parts of water, hydrochloric acid is added and the product filtered off. It is washed successively with alcohol and water and dried below 50° C.

The so-obtained new product is a bluish powder readily soluble in benzene and kerosene with a bright blue color.

*Example 10*

For this example, 1,4-dianilino-2,3-dimercaptoanthraquinone is made as follows:

138 parts of 2,3-dichloro-1,4-dianilinoanthraquinone (obtained by reacting 1,2,3,4-tetrachloroanthraquinone with aniline), 1500 parts of alcohol and 225 parts of a 30% aqueous solution of sodium hydrosulfide are stirred and boiled under a reflux condenser for 5 hours. After filtering from unchanged material the dark green solution is acidified by adding hydrochloric acid, filtered and the product washed with water.

A paste of 1,4-dianilino-2,3-dimercaptoanthraquinone made as above is stirred into 1000 parts of pyridine and 100 parts of cetyl bromide and heated at 90–95° C. for half an hour. On cooling and acidifying with hydrochloric acid the product separates as a green wax-like mass and is filtered. It is washed with water and dried.

The so-obtained new compound dissolves readily in benzene and kerosene to give dark green solutions.

*Example 11*

For this example, 2-bromo-1-amino-4-hydroxyethylamino-anthraquinone is prepared by condensing 1,3-dibromo-4-aminoanthraquinone with ethanolamine.

10.83 parts of 2-bromo-1-amino-4-hydroxyethylamino-anthraquinone, 100 parts of alcohol and 25 parts of a 25% aqueous solution of sodium disulfide are stirred and boiled for half an hour. 20 parts of pyridine and 8 parts of dodecyl bromide are added to the solution. The mixture is boiled for 2 hours; the product is filtered cold and washed with alcohol and water. It is a dark blue substance, which dissolves readily in benzene with a blue color, and in concentrated sulfuric acid to a red-brown solution.

*Example 12*

For this example, 1,4-diamino-2-p-cresyloxy-3-mercaptoanthraquinone is made by the process of British Patent No. 387,765, but using p-cresol instead of phenol.

1,4-diamino-2-p-cresyloxy-3-mercaptoanthraquinone is converted to 1,4-diamino-2-p-cresyloxy-3-anthraquinonyl dodecyl sulfide by the process of Example 7. The so-obtained coloring matter is a violet substance, which dissolves readily in cold benzene with a bright violet color.

*Example 13*

For this example, 1,4-diamino-2-o-cresyloxy-3-mercaptoanthraquinone is made by the process of British Patent No. 387,765, but using o-cresol instead of phenol.

1,4-diamino-2-o-cresyloxy-3-mercaptoanthraquinone is converted to 1,4-diamino-2-o-cresyloxy-3-anthraquinonyl dodecyl sulfide by the process of Example 7. The so-obtained coloring matter is a violet substance, which dissolves readily in benzene with a bright violet solution.

*Example 14*

For this example, 1,4-diamino-2-m-cresyloxy-3-mercaptoanthraquinone is made by the process of British Patent No. 387,765, but using m-cresol instead of phenol.

1,4-diamino-2-m-cresyloxy-3-mercaptoanthraquinone is converted to 1,4-diamino-2-m-cresyloxy-3-anthraquinonyl dodecyl sulfide by the process of Example 7. The so-obtained coloring matter is a violet substance, which dissolves readily in benzene with a bright violet solution.

I claim:

1. An anthraquinonyl alkyl sulfide carrying at least one auxochromic group in an alpha position of the anthraquinone radical, and in which the alkyl group contains from 8 to 20 carbon atoms.

2. An anthraquinonyl-beta-alkyl sulfide carrying at least one auxochromic group in an alpha position of the anthraquinone radical, and in which the alkyl group contains from 8 to 20 carbon atoms.

3. An alpha-amino-anthraquinonyl alkyl sulfide in which the alkyl group contains from 8 to 20 carbon atoms.

4. An alpha-amino-anthraquinonyl alkyl sulfide in which the alkyl group contains from 8 to 20 carbon atoms and which contains at least one additional auxochromic group in the anthraquinone radical.

5. An alpha-amino-anthraquinonyl-beta-alkyl sulfide in which the alkyl group contains from 12 to 16 carbon atoms.

6. A 1-amino-anthraquinonyl-2-alkyl sulfide in which the alkyl group contains from 8 to 20 carbon atoms.

7. A 1-amino-anthraquinonyl-2-alkyl sulfide in which the alkyl group contains from 8 to 20 carbon atoms and which contains an auxochrome group in the 4-position.

8. A 1-amino-anthraquinonyl-2-alkyl sulfide in which the alkyl group contains from 8 to 20 carbon atoms and which contains an ether group in the 3-position.

9. The process which comprises reacting an anthraquinone compound carrying at least one auxochromic group with a long chain alkyl compound containing from 8 to 20 carbon atoms, one of said compounds containing a reactive halogen atom and the other compound a mercaptan group, whereby a long chain alkyl thio ether of the anthraquinone compound is formed.

10. The process which comprises reacting an alpha-amino-anthraquinone-beta-mercaptan with a long chain alkyl halide containing from 8 to 20 carbon atoms.

11. The process which comprises reacting an alpha-amino-anthraquinone-beta-mercaptan with a cetyl halide.

12. The process which comprises reacting a 1-amino-anthraquinone-2-mercaptan with a cetyl halide.

FRANK LODGE.